US008774102B2

(12) United States Patent
Hsu et al.

(10) Patent No.: US 8,774,102 B2
(45) Date of Patent: Jul. 8, 2014

(54) METHOD AND APPARATUS FOR SCHEDULING AND MODULATION AND CODING SELECTION FOR SUPPORTING QUALITY OF SERVICE IN TRANSMISSIONS ON FORWARD SHARED RADIO CHANNELS

(75) Inventors: Liangchi (Alan) Hsu, San Diego, CA (US); Mark W. Cheng, San Diego, CA (US); Giridhar Mandyam, Dallas, TX (US)

(73) Assignee: Vringo Infrastructure Inc., New York, NY (US)

( * ) Notice: Subject to any disclaimer, the term of this patent is extended or adjusted under 35 U.S.C. 154(b) by 621 days.

(21) Appl. No.: 12/035,133

(22) Filed: Feb. 21, 2008

(65) Prior Publication Data
US 2008/0144570 A1 Jun. 19, 2008

Related U.S. Application Data

(60) Division of application No. 10/898,354, filed on Jul. 26, 2004, now Pat. No. 7,561,509, which is a continuation of application No. 10/025,609, filed on Dec. 26, 2001, now Pat. No. 6,901,046.

(60) Provisional application No. 60/280,814, filed on Apr. 3, 2001.

(51) Int. Cl.
*H04W 4/00* (2009.01)
*H04L 12/56* (2006.01)
*H04L 1/00* (2006.01)
*H04L 12/54* (2013.01)
*H04W 28/18* (2009.01)
*H04W 72/12* (2009.01)

(52) U.S. Cl.
CPC ............... *H04W 28/18* (2013.01); *H04L 47/14* (2013.01); *H04L 49/90* (2013.01); *H04L 47/621* (2013.01); *H04W 72/12* (2013.01); *H04W 72/1205* (2013.01); *H04L 1/0016* (2013.01); *H04L 47/626* (2013.01); *H04L 12/5693* (2013.01); *H04L 1/0003* (2013.01); *H04L 47/522* (2013.01); *H04L 1/0009* (2013.01); *H04L 47/56* (2013.01)
USPC ........... 370/329; 370/310; 370/328; 370/331; 370/332; 370/333; 370/334; 455/436; 455/437; 455/438; 455/439; 455/440; 455/441; 455/442; 455/443; 455/444

(58) Field of Classification Search
USPC .......................................... 370/310, 328, 329
See application file for complete search history.

(56) References Cited

U.S. PATENT DOCUMENTS

| 6,035,210 A | 3/2000 | Endo et al. ............. 455/522 |
| 6,253,063 B1 | 6/2001 | Cudak et al. ............ 455/63.1 |

(Continued)

FOREIGN PATENT DOCUMENTS

WO 03010984 2/2003 ............. H04Q 7/22

*Primary Examiner* — Hassan Phillips
*Assistant Examiner* — Gautam Sharma
(74) *Attorney, Agent, or Firm* — Cozen O'Connor

(57) ABSTRACT

The invention is a process and system for controlling selection of which MS is to receive the next packet data transmission on a forward channel and selection of which plural MCS is to be used for the packet data transmissions on the forward channel. A process for controlling selection of MCS method to be used by a BTS (10) to transmit data packets over a forward shared channel to a MS (12) in accordance with the invention stores information at the BTS, the information containing MCS methods which may be selected to transmit data packets over the forward shared channel to the MS; receiving from the MS at the BTS a quality indication of transmission of data packets over the forward channel to the MS; and selecting a MCS method from a plurality of MCS methods which may be used to transmit data packets on the forward channel dependent upon the received quality indication.

13 Claims, 4 Drawing Sheets

(56) References Cited

U.S. PATENT DOCUMENTS

| | | | |
|---|---|---|---|
| 6,307,849 B1 | 10/2001 | Tiedemann, Jr. | 370/335 |
| 6,335,922 B1 | 1/2002 | Tiedemann, Jr. et al. | 370/335 |
| 6,374,117 B1 | 4/2002 | Denkert et al. | 455/522 |
| 6,400,699 B1 | 6/2002 | Airy et al. | 370/329 |
| 6,404,802 B1 | 6/2002 | Kang et al. | 375/146 |
| 6,456,598 B1 | 9/2002 | Le Strat et al. | |
| 6,567,375 B2 | 5/2003 | Balachandran et al. | 370/204 |
| 7,046,678 B2 | 5/2006 | Jiang et al. | |
| 2002/0036992 A1* | 3/2002 | Balachandran et al. | 370/329 |
| 2002/0044527 A1* | 4/2002 | Jiang et al. | 370/229 |
| 2002/0146983 A1* | 10/2002 | Scherzer et al. | 455/67.1 |
| 2003/0223429 A1* | 12/2003 | Bi et al. | 370/395.4 |
| 2008/0101280 A1* | 5/2008 | Gholmieh et al. | 370/328 |

* cited by examiner

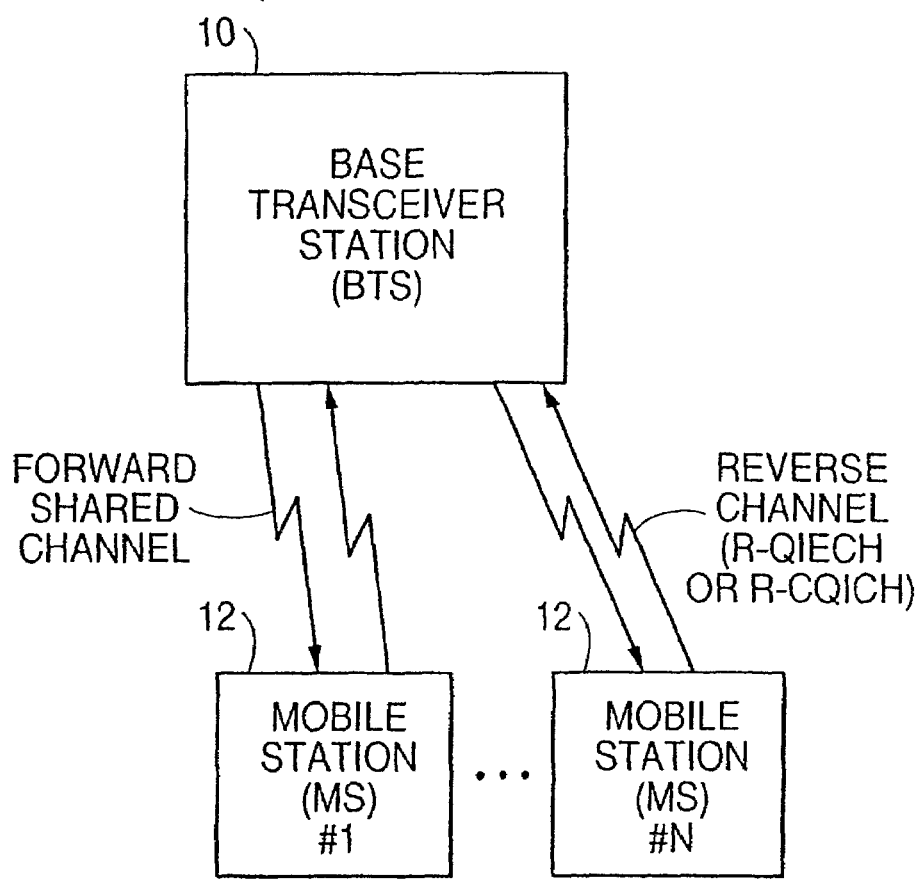

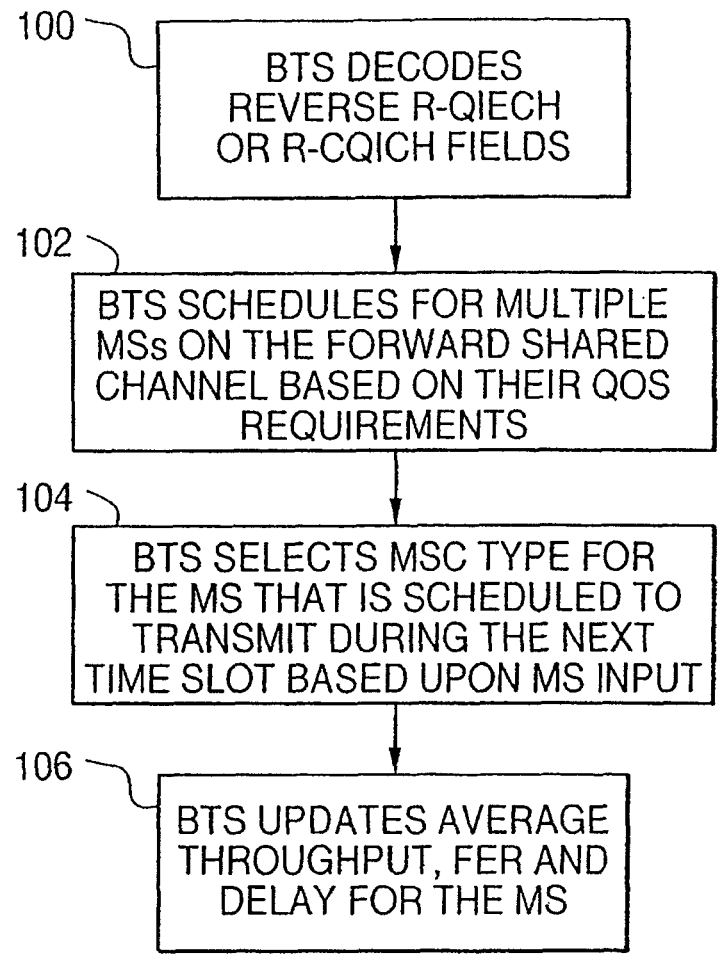
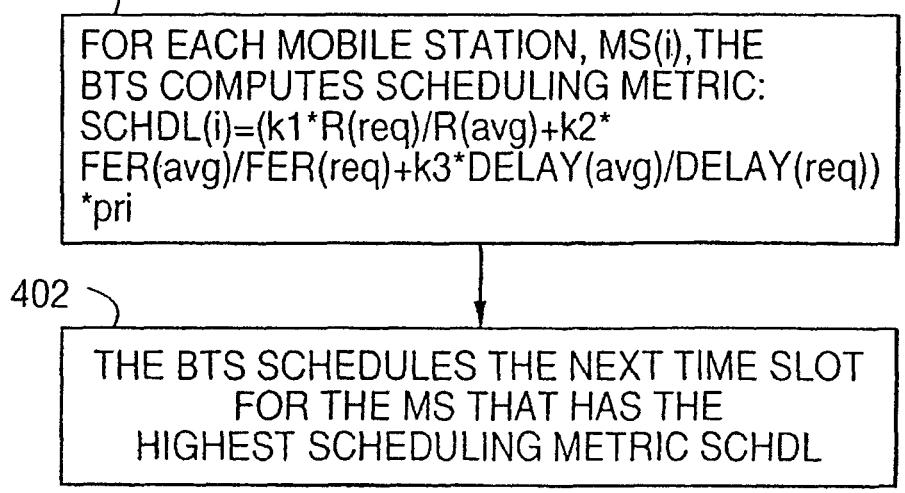

METHOD AND APPARATUS FOR SCHEDULING AND MODULATION AND CODING SELECTION FOR SUPPORTING QUALITY OF SERVICE IN TRANSMISSIONS ON FORWARD SHARED RADIO CHANNELS

CROSS-REFERENCE TO RELATED APPLICATION

The present application is a divisional application of Ser. No. 10/898,354, filed Jul. 26, 2004 now U.S. Pat. No. 7,561,509, which is a continuation of and a divisional application of Ser. No. 10/025,609, filed Dec. 26, 2001 now U.S. Pat. No. 6,901,046 and which claims the benefit of the filing date of Provisional Application Ser. No. 60/280,814, entitled "Method and Apparatus of Scheduling and Modulation/Coding Selection for supporting Quality of Service in CDMA 2000-1X EV-DV System", filed on Apr. 3, 2001, which applications are incorporated herein by reference in their entirety.

BACKGROUND OF THE INVENTION

1. Field of the Invention

The invention relates to wireless high-speed packet data transmissions on shared radio channels, such as CDMA2000 1XEV-DV and 3GPP HSDPA and more specifically, to quality of service (QoS) implementation for transmissions on the forward shared channel from a base transceiver station (BTS) to mobile stations (MS).

2. Description of the Prior Art

QoS in 1XEV-DV has been proposed to examine throughput, delay and frame error rate (FER) for packet data transmissions on a forward shared channel(s) from BTS to MS. See L. Jalloul, "Joint 1XTREME proposal for 1XEV-DV" 3GPP2-050-20001 204-006RI, Kauai, Hi., December 2000.

A problem exists with 1XEV-DV (e.g. 1XTREME) BTS scheduling of the forward shared channel transmissions while QoS is maintained for multiple users, especially for mixed real-time and non-realtime services and how the BTS selects modulation and coding schemes based on QoS requirements.

FIG. 1 illustrates a diagram of a prior art system including a BTS 10 and a group of N mobile stations (MS) 12 which may without limitation be used to practice the invention. The BTS 10 transmits packet data on a forward shared channel in accordance with a data BTS 10 transmits packet data on a forward shared channel in accordance with a data transmission protocol, such as the 1X EV-DV specification to the MS 12. The individual MS 12 make reverse channel transmissions to the BTS 10, including without limitation on the Reverse Quality Echo Channel (R-QIECH) or Reserve Channel Quality Indication Channel (R-CQICH) information of the MS's current received throughput and FER for the transmissions on the forward shared channel.

SUMMARY OF THE INVENTION

The present invention is a method and apparatus for (1) scheduling multiplexed transmissions on the forward channel(s) to individual MS within a group of MS and (2) selection of Modulation and Coding Selection (MCS) from a group of selectable MCSs for controlling QoS with a preferred application of the invention without limitation being the CDMA 2000-1X ED-DV System. The forward shared channel provides multiplexed high speed packet data services with MCS to control QoS for multiple users of the MS 12.

The fulfillment of QoS control and optimal radio resource management are two significant tasks for the BTS. The invention controls QoS by utilization of MS measurement feedback on a reverse channel followed by the choice of MCS for subsequent packet data transmissions to the MS providing the feedback dependent upon the feedback information which is used to select which MS is to receive the next transmission and which MSC is to be used to provide optimal data transmission. The BTS uses QoS criteria to schedule the next multiplexed transmission and the MSC for each MS. For the scheduled MS, the BTS selects the optimal MCS to fulfill the QoS requirement based upon the feedback from the MS and, as a result, efficiently utilizes the radio spectrum.

The invention may be implemented in diverse applications, including without limitation, BTSs of a CDMA2000 1XEV-DV application and MSs of a 1XEV-DV application if MS measurement feedback is used to optimize the MSC selection process.

A process for controlling selection of a modulation and coding selection method to be used by a base transceiver station to transmit data packets over a forward shared channel to a mobile station in accordance with the invention includes storing information at the base transceiver station, the information containing selections of modulation and coding selection methods which may be selected to transmit data packets over the forward shared channel to the mobile station; receiving from the mobile station at the base transceiver station a quality indication of transmission of data packets over the forward channel to the base station; and selecting a modulation and coding selection method from a plurality of modulation and coding selection methods which may be used to transmit data packets on the forward channel dependent upon the received quality indication. The information may correlate modulation and coding selection methods with frame error rate and throughput determined by the mobile station. Selection of one of the modulation and coding selection methods may optimize transmission of the data packets. The quality indication of transmission may be a ratio of Ec (pilot channel strength) to Nt (noise from other cells). The quality indication of transmission may be a function of frame error rate or a function of throughput which functions may be calculated by the mobile station over a plurality of data transmissions over the forward channel from the base transceiver station to the mobile station. The quality indication of transmission of data packets may contain a trigger that either frame error rate information or the throughput information is to be used in selecting a modulation and coding selection method and an indication of pilot signal strength and the pilot signal strength may be used in the selection of a modulation and coding selection method based upon either the designated frame error rate information or the designated throughput information. The trigger in the quality indication of transmission of data packets to use the frame error rate information may occur when the data packets received on the forward channel are determined by the mobile station to be sensitive to frame error rate. The trigger in the quality indication of transmission of the data packets to use the throughput information may occur when the data received on the forward shared channel are determined by the mobile station to be sensitive to throughput. The receiving of the quality indication at the base station may be over a reverse channel and the stored information may be stored in two tables. The reverse channel may be R-QUIECH or RCQICH.

A process for scheduling the transmission of data packets from a base transceiver station over a forward shared channel to a plurality of mobile stations in accordance with the invention includes receiving at the base station transceiver information from each of the plurality of mobile stations derived by each mobile station from data packets transmitted on the forward shared channel to each of the plurality of mobile stations which is a function at least two of a plurality of parameters, the parameters being throughput of the data packets, frame error rate of the data packets, delay of the data packets and subscriber priority; and scheduling a next transmission of data packets to one of the plurality of mobile stations based upon calculating a scheduling quantity for each of the plurality of mobile stations which is a function of at least two of the plurality of the parameters which satisfies a scheduling criteria to determine which mobile station is allocated the next transmission of data packets. The next transmission may be assigned to a mobile station which qualifies under the scheduling criteria by performing a comparison of all calculated scheduling quantities calculated for the mobile stations. The scheduling quantity may be a function of all of the parameters. The scheduling quantity may be a function of a ratio R(req)/R(avg), where R(req) is the required throughput of the data packets and R(avg) is the average throughput of the data packets, a function of a ratio FER(avg)/FER(req) where FER(avg) is the average frame error rate of the data packets and FER is the required frame error rate of the data packets, a function of a ratio DELAY(avg)/DELAY(req) where DELAY(avg) is the average transmission delay between transmission of the data packets and DELAY(req) is the maximum permissible transmission delay of the data packets and the subscriber priority with the subscriber priority being a saved subscriber priority of a priority of data transmission between subscribers of the mobile stations. The scheduling quantity SCHDL(i) may be defined as:

$$SCHDL(i)=(k1*R(\text{req})/R(\text{avg})+k2*$$

$$FER(\text{avg})/FER(\text{req})+k3*DELAY(\text{avg})/DELAY(\text{req}))\\*\text{pri}$$

where ki, k2 and k3 are normalization factors which are configurable at the base transceiver station and pri is the subscriber priority.

A process for a base transceiver station to resolve whether frame error rate or throughput of data packet transmissions to a mobile station over a forward shared channel should control a selection of which of a plurality of modulation and coding selection methods is to be used to transmit the transmission of data packets over the forward shared channel to the mobile station in accordance with the invention includes computing a frame error rate of data packet transmission to the mobile station and comparing that calculated frame error rate to a threshold frame error rate; computing a throughput data rate of data packet transmission to the mobile station and comparing that calculated throughput data rate to a threshold throughput data rate; generating a trigger at the mobile station which identifies which of frame error rate or throughput is to be used to control selection of a modulation and coding selection method to be used at the base transceiver station to transmit data packets on the forward shared channel; and transmitting the generated trigger to the base transceiver station where the trigger is used at least as part of a selection criteria for choosing one of a frame error rate or a throughput dependent modulation and coding selection dependent method used to transmit the data packets on the forward channel to the mobile station.

A system which schedules transmission of data packets in accordance with the invention includes a base station transceiver and a plurality of mobile stations; and wherein the base station transceiver receives information from each of the plurality of mobile stations derived by each mobile station from data packets transmitted on the forward shared channel to each of the plurality of mobile stations which is a function of at least two of a plurality of parameters, the parameters being throughput of the data packets, frame error rate of the data packets, delay of the data packets and subscriber priority; and the base station transceiver schedules a next transmission of data packets to one of the plurality of mobile stations based upon calculating a scheduling quantity for each of the plurality of mobile stations which is a function of at least two of the plurality of the parameters which satisfies a scheduling criteria to determine which mobile station is allocated the next transmission of data packets. The next transmission may be assigned to a mobile station which qualifies under the scheduling criteria by performing a comparison of all calculated scheduling quantities for the mobile stations. The scheduling quantity may be a function of all of the parameters. The function of throughput may be a function of a ratio R(req)/R(avg), where R(req) is the required throughput of the data packets and R(avg) is the average throughput of the data packets, a function of a ratio FER(avg)/FER(req) where FER(avg) is the average frame error rate of the data packets and FER is the required frame error rate of the data packets, a function of a ratio DELAY(avg)/DELAY(req) where DELAY(avg) is the average transmission delay between transmission of the data packets and DELAY(req) is the maximum permissible transmission delay of the data packets and the subscriber priority is a saved subscriber priority of a priority of data transmission between subscribers of the mobile stations. The scheduling quantity may be defined as:

$$SCHDL(i)=(k1*R(\text{req})/R(\text{avg})+k2*$$

$$FER(\text{avg})/FER(\text{req})+k3*DELAY(\text{avg})/DELAY(\text{req}))\\*\text{pri}$$

where ki, k2 and k3 are normalization factors which are configurable at the base transceiver station and pri is the subscriber priority.

A system in accordance with the invention includes a base transceiver station and a mobile station; and wherein the base transceiver station resolves whether frame error rate or throughput of data packet transmission to the mobile station over a forward shared channel should be used to control a selection of which of a plurality of modulation and coding selection methods is to be used to transmit data packets over the forward shared channel to the mobile station with the base transceiver station computing a frame error rate of data packet transmission to the mobile station and comparing the calculated frame error rate to a threshold frame error rate and a throughput data rate of data packet transmission to the mobile station and comparing the calculated throughput data rate to a threshold throughput data rate, and the mobile station generates a trigger which identifies which of frame error rate or throughput is to be used to control selection of a modulation and coding selection method to be used at the base transceiver station to transmit data packets on the forward shared channel and the generated trigger is transmitted to the base transceiver station where the trigger is used at least as part of a selection criteria for choosing selection of one of a frame error rate or a throughput modulation coding dependent method used to transmit the data packets on the forward channel to the mobile station. The generation of the frame error rate trigger in the mobile station can be based on the physical layer frame or application layer frame error rate.

BRIEF DESCRIPTION OF THE DRAWINGS

Having thus described the invention in general terms, reference will now be made to the accompanying drawings, which are not necessarily drawn to scale, and wherein:

FIG. 1 illustrates a prior art system of a base transceiver station and multiple mobile stations in which the present invention may be practiced.

FIG. 2 is a flow chart of the process for controlling channel allocation according to the present invention.

Figure 3:
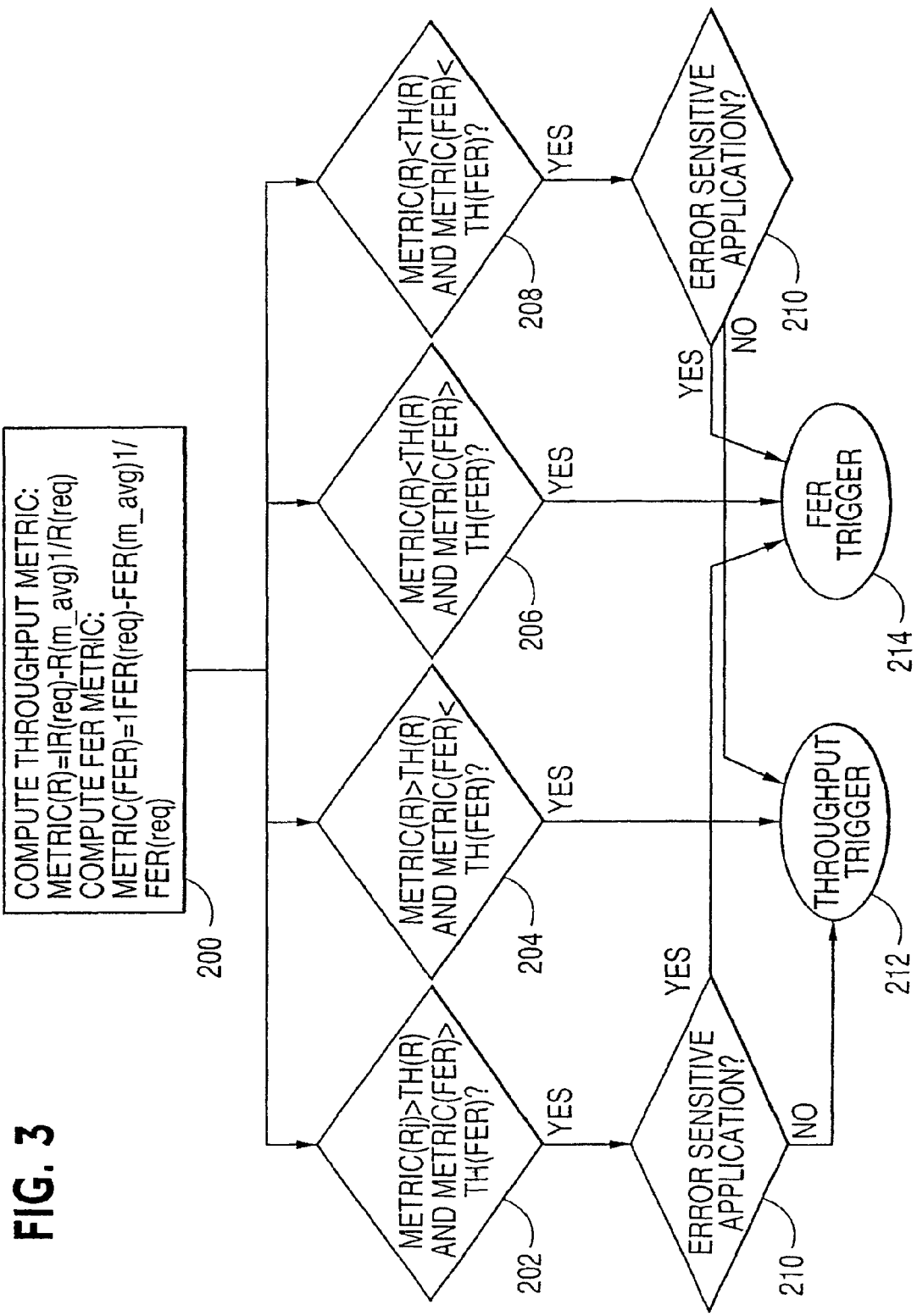

FIG. 3 is a flow chart of the generation of triggers by the MSs which are used to control MSC by the BTS.

FIG. 4 is a block diagram of a scheduler in a BTS in accordance with the present invention which controls the assigning of time slots for transmission to a MS having a highest calculated SCHDL(i).

Figure 5:
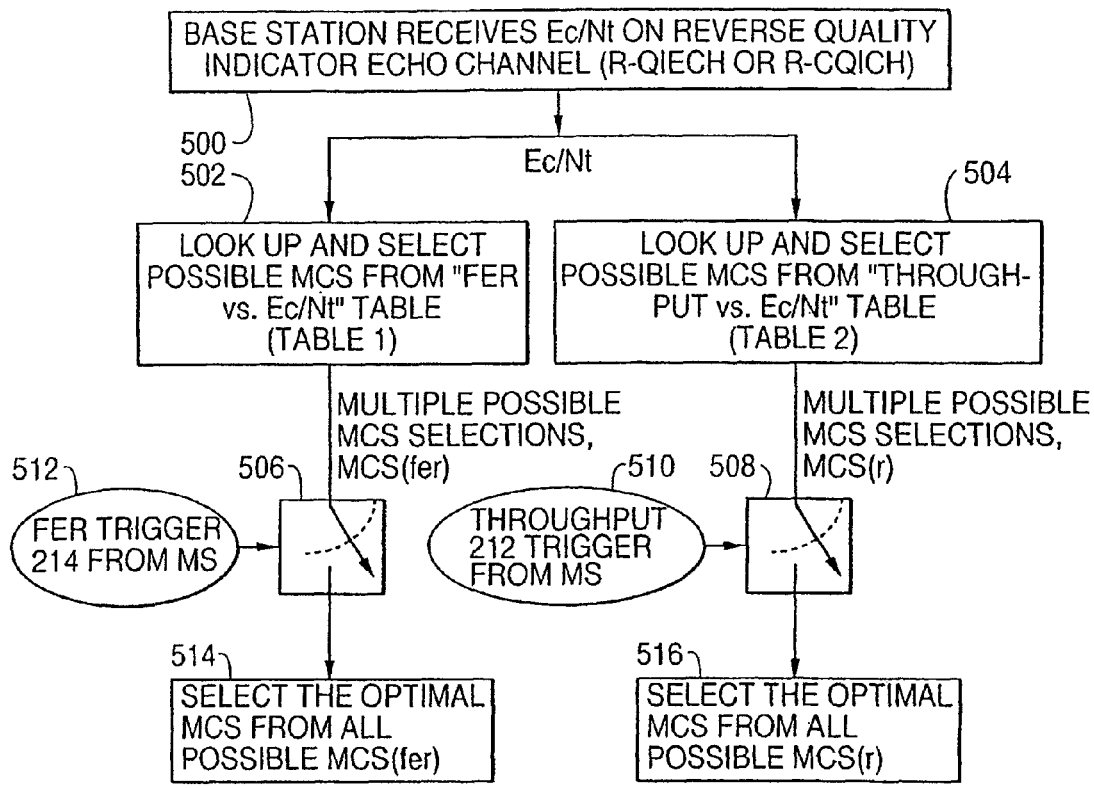

FIG. 5 illustrates a process of MSC selection by a BTS in accordance with the present invention.

Figure 6:
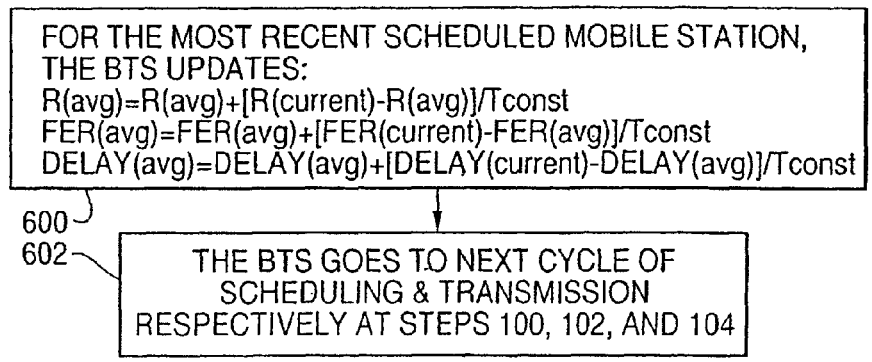

FIG. 6 illustrates the calculation process by the BTS for calculating parameters used in scheduling of the time slot for the next data packet transmission to one of plural MSs in accordance with the present invention.

DESCRIPTION OF THE PREFERRED EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is a process and system which uses the forward shared channel of the prior art, such as, but not limited to, FIG. 1 to provide high speed packet data services for multiple MSs with a controlled QoS. The invention controls (1) the selection of which MS is to receive a next transmission on the forward shared channel and (2) which MCS method is to be used to maintain or improve QoS in the transmissions to the MS. The fulfillment of a QoS requirement for each MS and optimal radio resource management are important functions provided by the BTS by the present invention. The invention uses MS measurement feedback and selection of a MCS from a group of selectable MSC to achieve the above performance benefits.

FIG. 2 illustrates a flow chart of the process steps for scheduling of the next MS to receive a transmission of data packets on the shared forward channel and MCS selection from a selectable group of MCSs by the BTS which are performed by at least one processor in each of the BTS and in each MS (not illustrated). At point 100, the BTS receives the quality indication described below from the MS that has just received the transmission of data packets on the forward shared channel. The quality indication includes the ratio of pilot channel to the interference from other cells, (e.g. Ec/Nt) and the throughput trigger or FER trigger as described below with reference to FIG. 3 which is used to select the MCS to be used to make a packet data transmission on the forward channel from a group of selectable MCSs. At point 102, the BTS schedules the next transmission slot of each forward shared channel for which multiple MSs contend. Scheduling is based on the QoS requirement of each MS user. Once a particular MS has been scheduled for the next transmission slot at point 104, the BS selects the optimal MCS to fulfill the required QoS. At point 106, the BTS updates the dynamic statistics of average throughput, FER and delay for the MS for the next process cycle as described below with reference to FIG. 5.

The invention provides for forward shared channel allocation and QoS management by:
1. MS measurement feedback decoded at point 100
2. Scheduling at point 102
3. MCS selection at point 104

All three points 100, 102 and 104 are part of the processes of the invention and the first point 100 is also related to 1XEV-DV standardization. Hereinafter, the processes represented by the points 100, 102 and 104 are discussed respectively with reference to FIGS. 2, 3 and 4.

Point 100 R-QIECH Indication Fields:

In order for the BTS to dynamically resolve the trade-off between the calculated throughput metric and FER metric used to generate a throughput or FER trigger described below with reference to FIG. 3, at least one processor of the BTS relies on MS feedback on a reverse channel which may without limitation be the R-QIECH or R-CQICH for the decision process. Throughput measured above the TCP layer is the preferred source of the throughput measurement but the invention is not limited thereto. The MS, sitting at the end point of the communication link, has a clear understanding of the current throughput and FER trade-off based on the application requirement and the buffer limitations of the MS which are used to generate a throughput or FER trigger depending upon the determined performance seen by the MS in the last transmissions(s) thereto. Alternatively, the mobile station also can use the physical layer or application layer frame error rate to generate the quality indication including the FER trigger when FER triggering is used to select MCS based upon FER. This quality indication can be bundled inside the Reverse Quality Indication Echo channel (R-QIECH) SDU or passed by the L3 layer signalling standard and preferably includes either a throughput or FER trigger and Ec/Nt as described below. But the approach using L3 signalling is less attractive due to the timing consideration.

At least one processor in the MS performs the "metric contention process" as shown in FIG. 3. The requested ("req") QoS parameters are negotiated through IS-707A standard for 1X-EV-DV systems. The corresponding QoS average values ("m_avg") are the statistical averages updated inside the MS as indicated at point 200 and defined as follows:

$$\text{metric}(R) = \tfrac{1}{2}IR(\text{req}) - R(m\_\text{avg})\tfrac{1}{2}/R(\text{req})$$

$$\text{metric}(FER) = \tfrac{1}{2}FER(\text{req}) - FER(m\_\text{avg})\tfrac{1}{2}FER(\text{req})$$

The throughput metrics, namely metric(R) and metric (FER) are computed based on the negotiated QoS parameters and MS internal statistics. These metrics represent the present deficiency of throughput and FER and are compared with deficiency thresholds ("TH") as indicated at decision points 202-208. The deficiency thresholds are configurable parameters based on the application. If the deficiency exceeds the deficiency threshold TH, the deficiency indicates that at the BTS an effort is required to compensate for that deficiency. As shown in FIG. 3, the four decision points 202, 204, 206 and 208 each use two metrics (metric(R) and metric(FER)) and two thresholds (TH(R) and (TH(FER)) in the decision process to generate the throughput trigger 212 or FER trigger 214 depending on whether MCS selection is to be based upon throughput or FER considerations.

An extra decision point 210 "error sensitivity" of the application/user in question is used to resolve any deadlock contention between throughput and FER trigger determination which drives the decision to be based upon a FER trigger if such is important to the user. This factor is explicitly indicated from the application layer or implicitly derived/mapped by the lower layer at the MS. Finally, the trigger (either throughput trigger 212 or FER trigger 214) is derived from the metric contention process. The trigger (either 212 or 214) then is transmitted in the R-QIECH SDU together with the pilot strength Ec/Nt. The BTS decodes these fields at point 100 and uses these fields as inputs for the optimal MCS decision process (inputs 510 and 512 shown in FIG. 5) to complete the MCS selection as described below.

Point 102: Scheduling for Multiple MSs

"Best-effort" high-speed packet data services over CDMA wireless radio channels have been developed using 1X-EV-DO technology. A forward link "best effort" scheduler was also proposed in the publication cited above. In that publication, only throughput (data rate) was taken into account when the BTS schedules multiple MSs to transmit on the forward shared channel. In other words, the requested and average throughputs are translated into the priority of transmission. The "Assured Mode", as defined in IS-707A/IS-2000, for packet data services that require restrictive QoS is not addressed in the publication cited above. The invention improves scheduling when compared to the publication cited above.

As shown in FIG. 4, a scheduler is implemented in at least one processor of the BTS. The scheduler takes into account user priority and QoS requirement parameters, including throughput, frame error rate (FER), and delay as indicated at block 400. The requested values (req) and the present average values (avg) of QoS parameters are considered in the "scheduling metric", SCHDL(i).

SCHDL(i)=((metric(throughput)+metric(FER)+metric (delay))*pri, as indicated in block 400, where metric(throughput)=$k1*R$(req)/$R$(avg), metric(FER)=$k2$*FER(avg)/FER(req), metric(delay)=$k3$*DELAY(avg)/DELAY(req), and k(i) (e.g. k1, k2 and k3)=normalization factors configurable at the base station and pri=requested priority subscription priority which is saved as part of the user profile.

Subscription priority is saved as part of the user profile.

For "assured mode" services, all requested ("req") QoS parameters are negotiated through the IS-707A standard for 1X-EV-DV systems. All the corresponding QoS average values ("avg") are the statistical averages over a long period of time and are updated after each transmission period. The average process of point 106 is described below with reference to FIG. 6. "Pri" is the requested priority multiplied with the subscription priority that are defined in IS-707A.

The scheduling is done based on the "scheduling metric", SCHDL(i) of FIG. 4. At least one processor of the BTS schedules the next transmission slot of the forward shared channel for the MS that has the highest SCHDL(i) value as indicated at block 402.

Point 104: MCS Selection for the Scheduled MS

Once the BTS has completed scheduling for the next transmission period, the MSC for the scheduled MS is performed in the processing at point 104.

The process that the BTS performs without limitation to select a MCS method is the "optimal MCS decision process" shown in FIG. 5. The BTS receives the forward channel quality indication from the Reverse Quality Indication Echo Channel (R-QIECH or R-CQICH) for each transmission duration at point 500. Based on the quality indication (Ec/Nt), the BTS looks up information used to select the MSC as a function of FER and throughput which may be without limitation stored in two internal tables indicated at points 502 and 504: Table 1-"FER vs. Ec/Nt table" and Table 2-"throughput vs. Ec/Nt table". Each table look-up generates a set of possible MCS selections to be used to control transmission of data packets from the BTS to multiple MSs. Next, based on the trigger (either throughput trigger 212 or FER trigger 214) obtained from the reverse channel, such as R-QEICH or R-CQICH, the BTS determines which MCS set from Table 1 or Table 2, or from any storage containing the MSC selection information as a function of FER, throughput and Ec/Nt, should be dominating as indicated as selection points 506 and 508 which are responsive respectively to the input throughput trigger 212 at point 510 and the input FER trigger 214 at point 512. Only one selection occurs at a time based upon either the throughput trigger 212 or the FER trigger 214. When the throughput trigger is indicated, the optimal MCS is selected from the throughput MCS set (i.e. MCS(r)), as indicated at block 516. If the FER trigger is indicated, the optimal MCS is selected from the FER MSC set (i.e. MCS(fer)) as indicated at block 514. Note that the selection is "optimal" because the MCS with lowest FER or with the highest throughput is selected. Also note that Tables 1 and 2 or other equivalent storage are configurable at the BTS.

An example explaining the optimal MCS decision process is as follows: After obtaining Ec/Nt, the BTS looks up Table 1 and identifies N possible MCS selections and N corresponding FER values, MCS (fer)n and FER(current)n, where n= 1 . . . N and looks up Table 2 and identifies M possible MCS selections with M corresponding throughput values, MCS (r)m and R(current)m, where m=1 . . . M. If trigger FER is indicated, the MCS(fer) with the lowest FER is selected. If throughput trigger is indicated, the MCS(r)m with highest throughput is selected. The corresponding FER value from Table 1 becomes FER(current), and the corresponding throughput value from Table 2 becomes R(current). FER (current) and R(current) are the instantaneous FER and throughput for the next transmission. If throughput trigger is indicated, the MSC(r)m with highest throughput is selected. These values are also used to update the averages at point 106 discussed below with reference to FIG. 6.

Point 106: Updating Average of Throughput, FER, and Delay

After each transmission, the BTS updates the average of throughput, FER, and delay as indicated at block 600 of FIG. 6. These average values are used for the next cycle of scheduling of a MCS process as indicated at block 602. The averaging process is a low-pass process of instantaneous values over a time period, Tconst, longer than the transmission duration, e.g. (N*5) ms, where N is configurable in the BTS. This process is similar to the process of the publication cited above. The averaging process shown in FIG. 6 is also expressed as:

$R$(avg)next=$R$(avg)+[$R$(current)−$R$(avg)]/$T$const

FER(avg)next=FER(avg)+[FER(current)−FER(avg)]/ $T$const

DELAY(avg)next=DELAY(avg)+[DELAY(current)− DELAY(avg)]/$T$const.

The actual scheduling of a particular MS is based upon the calculation by at least one processor in the BTS of the quantity SCHDL(i) of FIG. 4 with the forward channel transmission slot being assigned to the MS meeting a scheduling criteria which is preferably the MS having the highest calculated value of SCHDL(i) as indicated at block 402. The scheduling may be based on and may be a function of at least two of the parameters of the throughput of the data packets, frame error rate of the data packets, delay of the data packets and subscriber priority of block 400 with the scheduling being a function of all four parameters being preferred.

While the invention has been described in terms of its preferred embodiments, it should be understood that numerous modifications thereto may be made without departing from the spirit and scope of the appended claims. It is intended that all such modifications fall within the scope of the appended claims.

What is claimed is:

1. A method comprising:
receiving at a base station transceiver information from each of a plurality of mobile stations derived by each mobile station from data packets transmitted on a forward shared channel to each of the plurality of mobile stations which is a function of at least two of a plurality of parameters, the parameters being throughput of the data packets, frame error rate of the data packets, delay of the data packets and subscriber priority, the received information being sent to the base station transceiver autonomously by each of the plurality of mobile stations without the mobile stations being polled for the information by the base station transceiver; and
scheduling a next transmission of data packets to one of the plurality of mobile stations based upon calculating a scheduling quantity for each of the plurality of mobile stations which is a function of at least two of the plurality of the parameters which satisfies a scheduling criteria to determine which mobile station is allocated the next transmission of data packets,
wherein the scheduling quantity is a function of a ratio R(req)/R(avg),
where R(req) is the required throughput of the data packets and R(avg) is the average throughput of the data packets, a function of a ratio FER(avg)/FER(req) where FER(avg) is the average frame error rate of the data packets and FER is the required frame error rate of the data packets, a function of a ratio DELAY(avg)/DELAY(req) where DELAY(avg) is the average transmission delay between transmission of the data packets and DELAY(req) is the maximum permissible transmission delay of the data packets and the subscriber priority is a saved subscriber priority of a priority of data transmission between subscribers of the mobile stations.

2. A method in accordance with claim 1, wherein the next transmission is assigned to a mobile station which qualifies under the scheduling criteria by performing a comparison of all calculated scheduling quantities for the mobile stations.

3. A method in accordance with claim 2, wherein the scheduling quantity is a function of all of the parameters.

4. A method in accordance with claim 1, wherein the scheduling quantity is a function of all of the parameters.

5. A method in accordance with claim 3, wherein the scheduling quantity is SCHDL(i) and $$SCHDL(i)=(k1*R(req)/R(avg)+k2*$$

$$FER(avg)/FER(req)+k3*DELAY(avg)/DELAY(req))*pri$$

where ki, k2 and k3 are normalization factors which are configurable at the base transceiver station and pri is a requested priority subscription priority.

6. A method in accordance with claim 2, wherein the scheduling quantity is SCHDL(i) and $$SCHDL(i)=(k1*R(req)/R(avg)+k2*$$

$$FER(avg)/FER(req)+k3*DELAY(avg)/DELAY(req))*pri$$

where ki, k2 and k3 are normalization factors which are configurable at the base transceiver station and pri is a requested priority subscription priority.

7. A method in accordance with claim 4, wherein the scheduling quantity is SCHDL(i) and $$SCHDL(i)=(M*R(req)/R(avg)+k2*$$

$$FER(avg)/FER(req)+k3*DELAY(avg)/DELAY(req))*pri$$

where ki, k2 and k3 are normalization factors which are configurable at the base transceiver station and pri is a requested priority subscription priority.

8. A method in accordance with claim 1, wherein the scheduling quantity is SCHDL(i) and $$SCHDL(i)=(k1*R(req)/R(avg)+k2*$$

$$FER(avg)/FER(req)+k3*DELAY(avg)/DELAY(req))*pri$$

where ki, k2 and k3 are normalization factors which are configurable at the base transceiver station and pri is a requested priority subscription priority.

9. A method in accordance with claim 1, wherein the received information is a function of delay of the data packets, the delay of the data packets being end to end delay.

10. A method comprising:
receiving at a base station transceiver information from each of a plurality of mobile stations derived by each mobile station from data packets transmitted on a forward shared channel to each of the plurality of mobile stations which is a function of at least two of a plurality of parameters, the parameters being throughput of the data packets, frame error rate of the data packets, delay of the data packets and subscriber priority, the received information being sent to the base station transceiver autonomously by each of the plurality of mobile stations without the mobile stations being polled for the information by the base station transceiver; and
scheduling a next transmission of data packets to one of the plurality of mobile stations based upon calculating a scheduling quantity for each of the plurality of mobile stations which is a function of at least two of the plurality of the parameters which satisfies a scheduling criteria to determine which mobile station is allocated the next transmission of data packets,
wherein the scheduling quantity is SCHDL(i) and $$SCHDL(i)=(M*R(req)/R(avg)+k2*$$

$$FER(avg)/FER(req)+k3*DELAY(avg)/DELAY(req))*pri$$

where ki, k2 and k3 are normalization factors which are configurable at the base transceiver station and pri is a requested priority subscription priority.

11. An apparatus comprising at least one processor, the at least one processor configured to cause the apparatus to at least:
receive information from each of a plurality of mobile stations derived by each mobile station from data packets transmitted on a forward shared channel to each of the plurality of mobile stations which is a function of at least two of a plurality of parameters, the parameters being throughput of the data packets, frame error rate of the data packets, delay of the data packets and subscriber priority, the received information being sent to the apparatus autonomously by each of the plurality of mobile stations without the mobile stations being polled for the information by the apparatus; and schedule a next transmission of data packets to one of the plurality of mobile stations based upon calculating a scheduling quantity for each of the plurality of mobile stations which is a function of at least two of the plurality of the parameters which satisfies a scheduling criteria to determine which mobile station is allocated the next transmission of data packets, wherein the scheduling quantity is a function of R(req) and R(avg), wherein R(req) is the required throughput of the data packets and R(avg) is the average throughput of the data packets, a function of a ratio FER(avg)/FER(req) where FER(avg) is the average frame error rate of the data packets and FER is the required frame error rate of the data packets, a function of a ratio DELAY(avg)/DELAY(req) where DELAY(avg) is the average transmission delay between transmission of the data packets and DELAY(req) is the maximum permissible transmission delay of the data packets and the subscriber priority is a saved subscriber priority of a priority of data transmission between subscribers of the mobile stations.

12. An apparatus in accordance with claim 11, wherein the next transmission is assigned to a mobile station which qualifies under the scheduling criteria by performing a comparison of all calculated scheduling quantities for the mobile stations.

13. An apparatus in accordance with claim 11, wherein the scheduling quantity is a function of all of the parameters.

* * * * *